United States Patent [19]

Ramos et al.

[11] 4,167,544
[45] Sep. 11, 1979

[54] POLYMER BLENDS

[75] Inventors: Alonso R. Ramos, Nendorf, France; Robert E. Cohen, Jamaica Plain, Mass.

[73] Assignee: Massachusetts Institute of Technology, Cambridge, Mass.

[21] Appl. No.: 936,142

[22] Filed: Aug. 23, 1978

[51] Int. Cl.² .................. C08L 9/00; C08L 53/00
[52] U.S. Cl. ................... 525/99; 260/DIG. 30; 260/DIG. 32
[58] Field of Search ............ 260/876 B, 894, DIG. 32

[56] References Cited

U.S. PATENT DOCUMENTS

| 3,326,824 | 6/1967 | Graham | 260/5 |
| 3,596,697 | 8/1971 | Hansley | 260/894 X |
| 3,766,295 | 10/1973 | Crossland et al. | 260/876 B X |
| 3,827,991 | 8/1974 | Arido et al. | 260/5 |
| 3,839,501 | 10/1974 | Wei et al. | 260/876 B |
| 3,907,929 | 9/1975 | Durst | 260/876 B |
| 4,104,326 | 8/1978 | Fodor | 260/876 B |

OTHER PUBLICATIONS

Ramos et al, in Polym. Eng. Sci. 17, No. 8, (1977), pp. 639-646.

Primary Examiner—Thomas DeBenedictis
Attorney, Agent, or Firm—Arthur A. Smith, Jr.; Paul J. Cook

[57] ABSTRACT

Homogeneous blends are provided comprising a diblock copolymer of isoprene and butadiene and a homopolymer constituent which is polyisoprene, polybutadiene or mixtures of polyisoprene and polybutadiene.

4 Claims, 3 Drawing Figures

POLYMER BLENDS

The Government has rights in some aspects of this invention pursuant to Contract No. N00014-77-C-0311 awarded by the U.S. Department of the Navy.

BACKGROUND OF THE INVENTION

This invention relates to polymeric compositions comprising polyisoprene, polybutadiene and a diblock copolymer of polyisoprene and polybutadiene.

Presently, blends of two or more polymers are utilized in a wide range of applications in order to obtain the characteristics of each of the components for the overall composition. In a specific application, elastomeric blends of polyisoprene and polybutadiene are utilized to make tires wherein polybutadiene provides skid and abrasion resistance while polyisoprene provides tensile and tear strength as well as crack resistance to the overall composition. Polybutadiene is not usually used by itself because of its poor processability and it usually amounts up to about 40 weight percent in blends with polyisoprene.

In polymer blends, imcompatibility of chemically dissimilar polymers is the rule and compatibility is the exception. In other words, blends of two or more polymers are hetrogeneous except in some special cases. For purposes of this disclosure, a blend is defined as hetrogeneous if mixing at the molecular level is not achieved. In order to avoid the confusion often found in the literature in describing two-phase polymer blends, the expression "degree of hetrogeneity" is defined as follows: The degree of hetrogeneity of a two-phase polymer blend decreases as the size of the characteristic domains in the blend decreases.

Prior to the present invention, diblock copolymers have been utilized to reduce the degree of hetrogeneity of blends of highly incompatible homopolymers. The mechanism of the formation of domains of each of the homopolymers is explained by proposing that the block copolymers have an emulsifying effect on both of the homopolymers. In these polymeric compositions, separate domains of each the homopolymers employed in the blends are clearly identifiable. This is undesirable since there will be corresponding portions of the blend which will be deficient in a desirable physical characteristic as a result of the domains under consideration being deficient in one of the homopolymers. Therefore, it would be desirable to provide polymer compositions comprising a blend of one or two homopolymers with a copolymer which is free of such domains and is homogeneous even at the molecular level.

SUMMARY OF THE INVENTION

In accordance with this invention, blends of polybutadiene and/or polyisoprene and a diblock copolymer of polybutadiene/polyisoprene are formed which are homogeneous in that they are free of domains of either homopolymer even at the molecular level. The molecular segment of the diblock copolymer whose composition is similar to that of the homopolymer present is large enough to overcome the repulsion forces between the homopolymer and the dissimilar molecular segment in forming the homogeneous binary blends. Homogeneous ternary blends are obtained when the lengths of the molecular segments of the diblock copolymer are approximately equal to each other and approximately equal to that of the similar homopolymer. The blends are not obtained by an emulsification effect but are homogeneous even at the molecular level.

DETAILED DESCRIPTION OF SPECIFIC EMBODIMENTS

Figure 1:
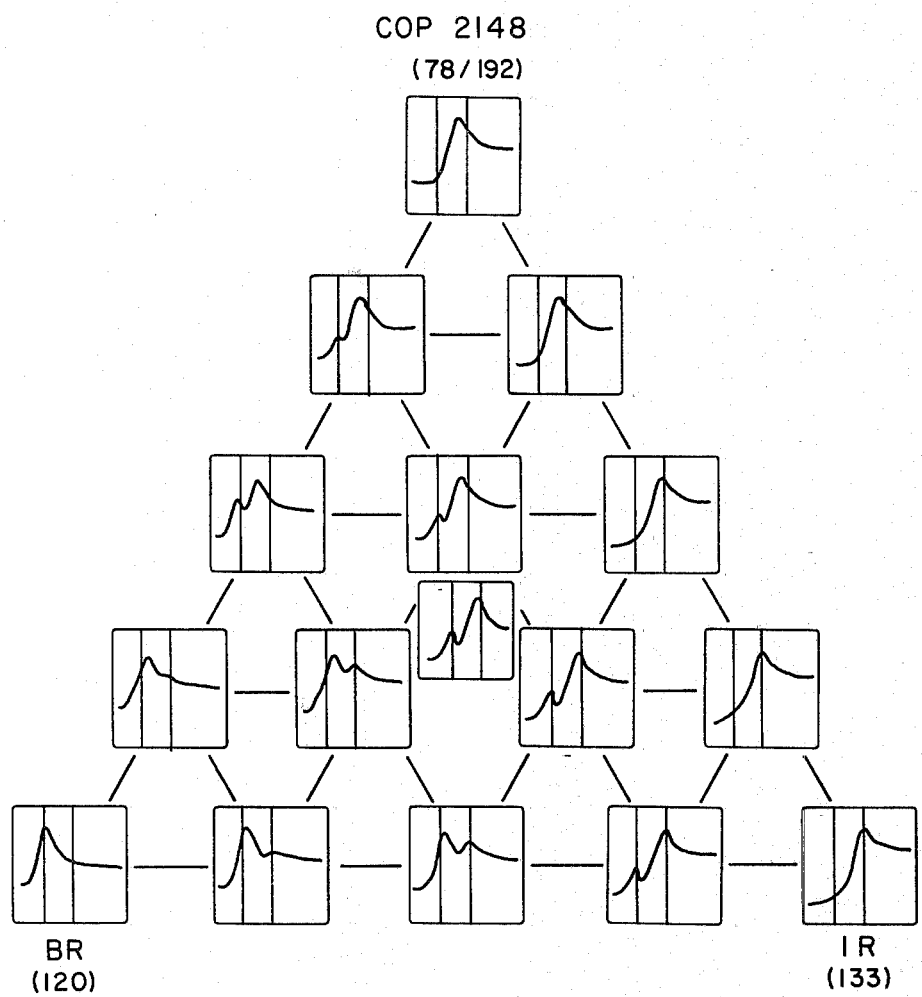
FIG. 1 is a montage of tangent $\delta$ vs temperature curves at 3.5 Hz for sixteen ternary blends of a butadiene (2)-isoprene-(1) block copolymer, butadiene and isoprene. The two vertical lines indicate the location of the two homopolymer peak maxima ($-82°$ C. and $-49°$ C.).

The hetrogeneity of a particular polymer blend will depend both on the thermodynamic compatibility of the constituents and in the kinetics of the separation mixing process. The kinetic factors assume a role much more important in polymer blending than they do in the case of small molecules because of the substantially lower mobility of macromolecules. The significance of this effect is that it makes possible the existance of metastable states, e.g., homogeneous blends of incompatible polymers or hetrogeneous blends of compatible polymers. A basic definition of polymer compatibility can be made in thermodynamic properties. Two polymers are considered compatible if their Gibbs free energy of mixing, $\Delta G$, is negative. The free energy upon mixing, $\Delta G$, is usually evaluated through its enthalpy and entropy contributions by the equation:

$$\Delta G = \Delta H - T\Delta S$$

wherein $\Delta H$ is the enthalpy of mixing, $T$ is the absolute temperature and $\Delta S$ is the entropy of mixing. For non-polar polymers, $\Delta H$ can be evaluated using the equation:

$$\Delta H = V_m(\delta_A - \delta_B)^2 \phi_A \phi_B$$

wherein $V_m$ is the total volume under consideration, $\delta$, and $\phi$, are respectively the solubility parameter and the volume fraction of polymer i. This equation shows that for all non-polar polymers $\Delta H$ is always non-negative.

In the mixing of two materials of low molecular weight, the gain in entropy is large and can overcome the normal positive, and hence unfavorable, enthalpy of mixing. With two polymers, however, the constraints on random mixing imposed by the macromolecular chains results in only a small gain in entropy.

In evaluating the homogeneity of the polymer blends of this invention, it is important to understand that it involves a matter of degree wherein the domains of each constituent become so small as to not be readily identifiable. While a number of alternative methods are available for determining homogeneity on a microscopic scale it has been found that the degree of homogeneity is most accurately determined by dynamic mechanical testing of blends. A sample of the polymer blend is secured in a holder and subjected to a sinusoidal displacement at one end while the force generated thereby is measured at the opposite end of the sample. At steady state, the strain lags the stress by a phase angle, δ. This phase angle is measured by a vector substraction method and is displayed on a meter. When the phase angle is measured as a function of temperature, a curve can be generated which contains more than one peak in the case of hetrogeneous blend and only one peak in the case of a homogeneous blend. Such observations have been substantiated by transmission electron microscopy on these blends, which clearly shows two phase morphology for hetrogeneous blends and no norphological features at all for homogeneous blends.

The compositions of this invention comprise homogeneous blends of a diblock copolymer of isoprene and butadiene with a homopolymer of isoprene and/or a homopolymer of butadiene. Thus, the compositions of this invention can comprise a binary blend or a ternary blend of polymeric constituents. In contrast, blends of polyisoprene and polybutadiene without the block copolymer are hetregeneous. When the average molecular weight of the polyisoprene and polybutadiene chain constituents of the diblock copolymer are generally equal, i.e., the molecular weight of one chain constituent is within a range of between about 50 and 200% of the other, preferably between about 100 and 120%, and the average molecular weight of the homopolymers, polyisoprene and butadiene are generally equal to that of the corresponding constituent of the copolymer, homogeneous ternary blends can be formed. The average molecular weight of the homopolymers should be within the range of about 50 to 1000%, preferably 65 to 200% of the molecular weight of the corresponding polyisoprene or polybutadiene chains of the diblock copolymer. In addition, the diblock copolymer should comprise more than about 50 weight percent based upon the sum of the weight of polyisoprene, polybutadiene and diblock copolymer in order to form homogeneous ternary blends. In addition, the relative weights of polyisoprene to polybutadiene should be between about 30 and 70 weight percent, preferably between about 50 and 60 weight percent.

Homogeneous binary blends are obtained when the homopolymer constituent blended with the diblock copolymer has an average molecular weight of the corresponding constituent of the copolymer within the ranges set forth above. To obtain a homogeneous binary blend, it is unnecessary that the copolymer be present in any minimum amount and thus can average from slightly more than zero weight percent up to and including one hundred percent.

While matching of the molecular weight of the homopolymer constituent(s) of the blend with the molecular weight of corresponding chain of the copolymer is the most important factor to be satisfied in order to form homogeneous blends, other secondary factors affect the homogeneity of the final blend. Thus, compatibility of the blend is improved when the polymer microstructure (i.e., cis, trans and vinyl content) of the homopolymer is most similar to the microstructure of the corresponding chain of the copolymer.

When forming the polymer-copolymer blends by solvent casting method, the particular solvent employed has little or no effect on polymer compatibility so long as the solvent dissolves each of the homopolymers and copolymers utilized in the blend. Representative suitable solvents include benzene, heptane, cyclohexane, tetrahydrofuran, toluene and the like.

In determining whether the blend is homogeneous, a sample of the blend is subjected to dynamic mechanical forces over a temperature range in order to identify glass transition points of the sample as indicated by the loss tangent, δ. In hetrogeneous blends, the sample exhibits more than one glass transition point while in homogeneous blends only one glass transition point is noted. It has been found that this method of analysis is more reliable in determining homogeneity of the sample as compared to other available methods including available electron microscopy techniques.

The compositions of this invention can be prepared by any conventional blending technique including milling, solvent casting, extrusion or the like. In addition, the compositions can be either uncrosslinked or crosslinked such as with an electrode beam, peroxides, sulfur or the like under conventional crosslinking conditions. Furthermore, the compositions can contain the usual resin additives such as fillers, dyes, pigments, antioxidants ultraviolet light stabilizers, antiozonants or the like, in the conventional concentrations.

In the following examples, all of the samples tested were prepared as follows. The samples were prepared by solvent casting wherein the solutions where prepared as follows: for a given blend composition, the corresponding amount of each of the components (IR, BR and/or diblock) was placed in a flask and enough reagent grade benzene was then added to give a 3 to 5 weight percent solution. An antioxidant, 1,3,5-trimethyl-2,4,6-tris (2,5-di-tert-butyl-4-hydroxybenzyl) benzene (antioxidant 330 by Ethyl Corporation, Baton Rouge, La.) was added to each solution in the amount of 0.5 phr.

Fast solvent evaporation was achieved with the spin casting technique. The apparatus used consisted of a hollow aluminum cylinder rotating at a speed of 3450 rpm, which generated a centrifugal force of about 740 g at the cylinder's inner wall. The solution was poured in when the cylinder was rotating. As the solvent evaporated, the solution-air interface moved away from the center until at the end of the process, a polymer film still containing some solvent rested against a teflon liner, which was used for easy removal of the cast film. The main dimensions of the cylinder used were: interal diameter 11.1 cm and inner-wall height 2.1 cm. The maximum volume of solution that could be poured in at once was around 190 $cm^3$. In order to speed up solvent evaporation and to avoid dust entering the cylinder, a small filtered air stream was directed to the bottom center of the cylinder. In practice, it took about 2 hours to evaporate enough solvent from a benzene solution to yield a self-supporting film; however, the films were always removed 24 hours after the solution had been poured in. Films obtained this way were about 0.05 cm thick; thicker films could be obtained either by increasing the concentration of the initial solution or by periodically refilling the cylinder. In addition, numerous blends were obtained by a slow solvent casting method in which the solvent evaporation took place over the period of several months.

The cast films were dried as follows: films were first placed under moderate vacuum (about 0.6 bar) at room temperature for at least 24 hours and then under high vacuum (0.1 bar or less) for a minimum of two days.

All films were lightly crosslinked to provide suitable samples for electron microscopy and dynamic mechanical testing. Crosslinking was achieved by irradiating the films with a 3 MeV electron beam under air. Samples were exposed to the beam on a conveyor belt, with a dose of 3-1/3 M rads per pass, to a total dose of 30 m rads. This method proved to give reproducible results.

Dynamic mechanical properties of the different blends were determined in a direct reading dynamic viscoelastometer, Rheovibron Model DDV-II-C (Toyo Baldwin Company, Ltd., Tokyo, Japan). The original sample chamber of this instrument were replaced by a special low-temperature chamber (produced by IMASS, Inc., Accord, Massachusetts), which not only facilitates attainment of cryogenic temperatures, but also keeps the sample under a nitrogen blanket at all temperatures. This nitrogen blanket keeps the entire sample closer to thermal equilibrium with the surrounding chamber and also reduces the chances of degradation.

The Rheovibron is most commonly used in the tensile and shear geometries, although sample holders have been developed to work in flexure and compression. A sinusoidal displacement is applied on one end of the sample and the force generated is measured at the other end. At steady state, it was found that the strain lags the stress by an angle, $\delta$. This phase angle is measured on a meter.

Among the sources of error in the Rheovibron are sample yield in the holder clamps, differences in applied and actual strain, instrument compliance and inertia effects. For the tensile geometry, the basic equation used to calculate the complex modulus $E^*$:

$$E^* = F/X \, L/S$$

ps where
 $F$ = force (N)
 $X$ = displacement (m)
 $L$ = sample length (m)
 $S$ = sample cross sectional area (m$^2$)

is modified to take into account the above-mentioned error sources to give:

$$E^* = \frac{(C/A - Mw^2 \, Doc)}{\{D[1 + (Doc/D)^2 - 2(Doc/D)\cos\alpha]^{\frac{1}{2}} - Dov\}} \frac{L}{S} \quad (2.3)$$

where
 $M$ = sample mass (Kg)
 $C$ = constant = 2 NM/m
 $w$ = frequency (Hz)
 $\alpha$ = phase angle from dial
 $D$ = dynamic force dial reading
 $A$ = preset amplification factor
 $Doc$ = instrument compliance correction
 $Dov$ = grip correction D, which is in the range of 0 to 1,000, is proportional to the amplification necessary for the stress transducer signal to reach a reference value. Doc is a consequence of the finite stiffness of the instrument and is equal to the value of D obtained when a short metal strip is installed in place of the sample. For the instrument used in this work the above dezermination yielded Doc=24.0/A for all four frequencies used (i.e., 2.5, 11, 35 and 110 Hz).

The grip correction depends on sample characteristics and the frequency of operation and is determined as follows. For a particular sample at a given strain amplitude and frequency, D is determined as a function of sample length, L. A plot of D vs. L yields a straight line, whose intercept at zero length is equal to Dov+Doc from which Dov can be obtained.

A simple method of overcoming the burden of determining Dov for each sample and set of conditions, and which is particularly useful for elastomers, involves end-butting both ends of a tensile sample to small aluminum plates 0.5 mm thick, which are in turn held by the grips. The end-butting was carried out by gluing a fresh, new, sample-end surface to a clean surface of an aluminum plate using a two-component epoxy ("5 minute" epoxy, Devcon Corporation, DAnvers, Massachusetts). The resulting bond was strong enough for all practical purposes. For endbutted samples, the term Dov is zero and only the instrument compliance correction needs to be used. The effect of the epoxy joint on the value of Doc was determined by end-butting two aluminum plates end to end and putting them in place of the sample. It was found to be negligible. Likewise, the inertia correction (i.e., term Mw$^2$ Doc) is negligible since it amounts to less than 1% even at the highest frequency.

The actual phase angle, $\delta$, differs from that being measured, $\alpha$, according to the following equation:

$$\tan \delta = \frac{\tan \alpha}{[1 - \frac{Doc}{D \cos \alpha}]}$$

For all samples, Rheovibron determinations were carried out in tension, covering the temperature range from $-135°$ C. up to 40° C. Since in the glass transition region the sample elastic modulus $E^*$ drops about three orders of magnitude, it was not possible to cover the whole temperature range with a single sample. Instead, in each case, a sample with a L/S ratio of about 500 to 600 was used to cover the modulus range from above 10$^3$ MPa down to about 50 MPa, and a second sample with a L/S $\sim$ 50 was used from above 200 MPa down to about 1 MPa. In either case, the sample was mounted in the grips, cooled down to the starting temperature, and then, as the sample slowly heated up, measurements were made using the standard procedure. The heating rate was always kept below 1° C./min and in the transition region(s), it was around 0.3° C./min. Sample temperature was monitored with a copper-constantan thermocouple which was in contact with the sample. The thermocouple wires were only 0.076 mm in diameter and had no perceptible effect on modulus measurements. The voltage from the thermocouple was displayed on a HP 3465B digital voltmeter, accurate to ±0.001 mV.

FIG. 1 is a montage of tangent $\delta$ vs. temperature curves obtained at a frequency of 3 to 5 Hz by the method set forth above for sixteen sample compositions. The butadiene resin utilized had an average molecular weight of 120,000. The isoprene resin utilized had an average molecular weight of 133,000. The diblock copolymer comprised butadiene and isoprene at a weight ratio of about 1 to 2 wherein the average molecular weight of a butadiene chain was 78,000 and the average molecular weight of the isoprene chain was 197,000. The location of each plot on the overall triangular diagram represents the composition of each sample according to the weight percentage of each of the three components. Each of the homopolymers exhibited only one damping peak located over the appropriate glass transition temperature ($-82°$ C. for polybutadiene and $-49°$ C. for polyisoprene). The diblock copolymer 2148 ($\frac{1}{3}$)

also showed by one damping peak located at −58° C. The remainder of the blends exhibited either one or two loss peaks depending upon the composition, but all peaks were located within the limits of temperature defined by the behavior of the two homopolymers.

All binary blends of COP 2148 (½) with IR (polyisoprene) exhibited a single loss peak. Both the position and shape of the loss peak of each one of the blends on the right edge of the triangle change progressively with composition showing that all these blends are homogeneous. This behavior can be explained by recalling that in diblock 2148 (½), the isoprene segment is twice as long as the butadiene segment and therefore the former contributes to the solubilization of the latter in the IR matrix. On the other hand, binary blends of COP 2148 (½) and BR (polybutadiene) form two phases, indicating that the butadiene segment is too short to prevent the long isoprene segment from causing the block copolymer to form its own phase.

Figure 2:
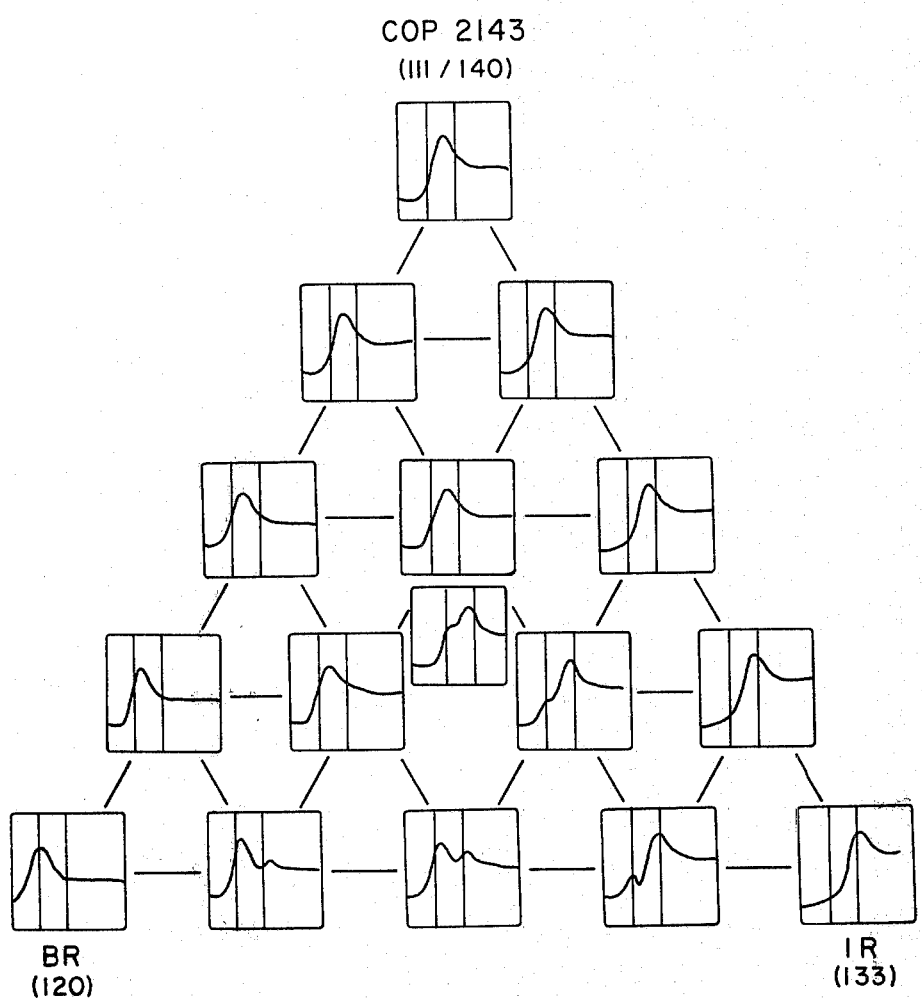
FIG. 2 is a montage of tangent $\delta$ vs temperature curves at 3.5 Hz for sixteen ternary blends of a butadiene (2)-isoprene-(1) block copolymer, butadiene and isoprene. The two vertical lines indicate the location of the two homopolymer peak maxima ($-82°$ C. and $49°$ C.).

FIG. 2 is a montage of tan δ vs temperature curves obtained at 3.5 Hz for sixteen different compositions. As in FIG. 1, the location of each plot on the overall triangular diagram represents the composition of each sample according to the weight percentage of each of the three components. The 5 curves at the base of the triangle are the same ones presented in FIG. 1.

The diblock copolymer 2143 (1/1) comprised butadiene of average chain length of 111,000 and isoprene of average chain length of 140,000 and showed a single damping peak located at −65° C. An unexpected behavior is observed with the blends along the sides of the triangle: samples containing diblock 2143 (1/1) and either one of the homopolymers exhibited only a single loss peak.

In addition to the sixteen samples selected to cover the triangular diagram, six blends were taken along the isopleth, i.e., the line of constant composition, 56 weight percent of polyisoprene. It is interesting to note that the transition location for the homogeneous blends of the diblock and one of the homopolymers moves gradually between the diblock location to that of the respective homopolymer. On the left side of the diagram, representing diblock-BR blends, the polybutadiene loss peak is shifted systematically to a higher temperature as more diblock is incorporated into the material. Along the right edge of the triangle, the polyisoprene loss peak is seen to shift to lower temperatures as more diblock is solubilized by the homopolymer.

The effect of diblock content at constant blend composition (along the isopleth) for the six additional samples revealed two well separated loss peaks up to 20% diblock content. At 40% diblock the lower temperature peak is still distinguishable as a shoulder on the larger high temperature peak. Up to this point the peak locations shifted relatively little, indicating that the composition of each phase has not been altered significantly. At 80% diblock, however, a dramatic change is seen; only one loss peak is observed at an intermediate temperature, close to the location of the single loss peak exhibited by the pure diblock. Thus, at higher diblock content, the block copolymer tends to "homogenize" the overall blend into a compatible system.

Figure 3:
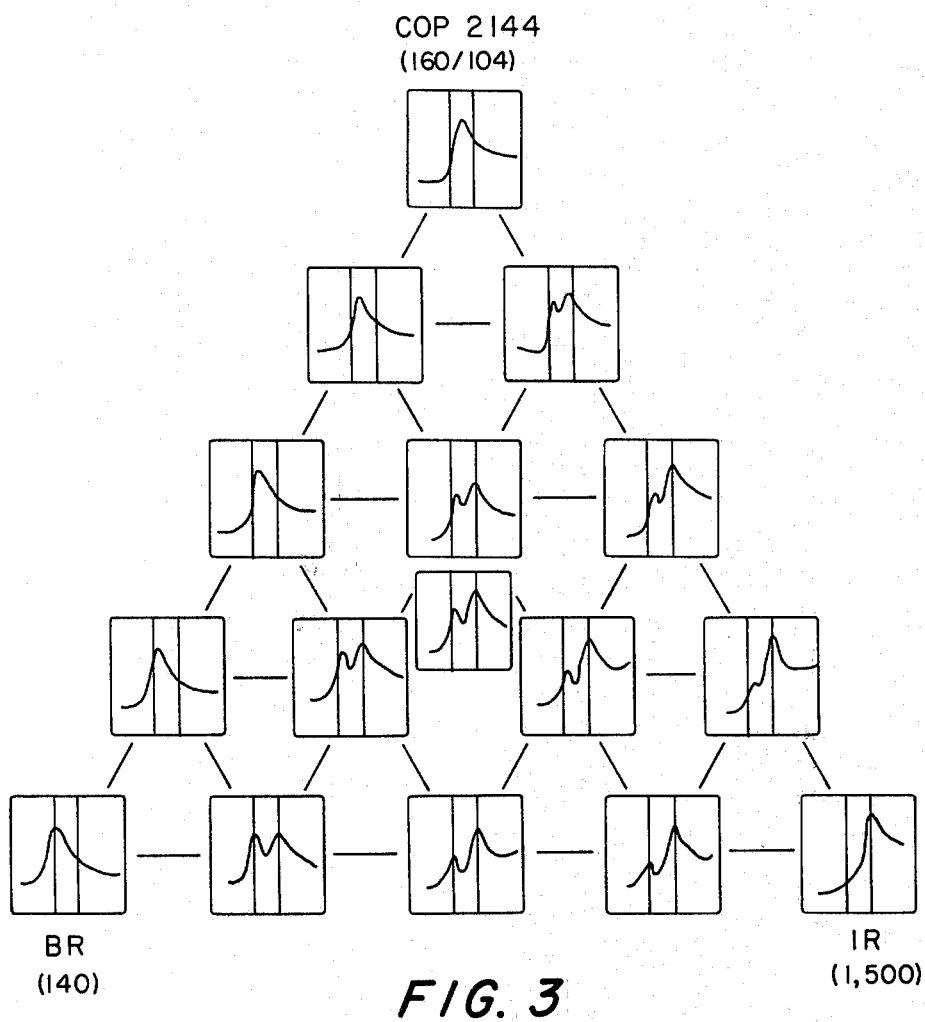
FIG. 3 is a montage of tangent $\delta$ vs temperature curves at 3.5 Hz for sixteen ternary blends of a butadiene (1)-isoprene-(2) block copolymer, butadiene and isoprene. The two vertical lines indicate the location of the two homopolymer peak maxima ($-82°$ C. and $49°$ C.).

FIG. 3 is a montage of tan δ vs. temperature curves obtained at 3.5 Hz for sixteen different sample compositions. The butadiene resin had an average molecular weight of 140,000. The isoprene resin had an average molecular weight of 1,500,000. The diblock copolymer comprised butadiene and isoprene at a weight ratio of about 2 to 1 wherein the butadiene chain had an average molecular weight of 160,000 and the isoprene chain had an average molecular weight of 104,000. As with FIGS. 1 and 2, the location of each plot on the overall triangular diagram represents the composition of each sample according to the weight percentage of each of the three components.

The diblock 2144 exhibited only one damping peak located at −71° C. Binary blends of COP 2144 with polybutadiene (left side of triangle) also showed a single loss peak, showing that these blends are homogeneous.

On the left side of this diagram, representing COP 2144 (2/1)-BR blends, the polybutadiene loss peak is shifted systematically to a higher temperature as more diblock is incorporated into the material. On the other hand, binary blends of COP 2144 (2/1) and IR form two phases indicating that the isoprene segment in the diblock is not long enough to prevent the diblock copolymer from phase separating from the isoprene homopolymer.

We claim:

1. A homogeneous composition comprising a diblock copolymer of isoprene and butadiene, and a homopolymer constituent selected from the group consisting of polyisoprene, polybutadiene and mixtures thereof wherein the average molecular weight of the homopolymer constituent is within the range of about 50 to 1000% of the average molecular weight of the corresponding polyisoprene or polybutadiene chain of the diblock copolymer.

2. The composition of claim 1 comprising a diblock copolymer of isoprene and butadiene and a homopolymer of isoprene.

3. The composition of claim 1 comprising a diblock copolymer of isoprene and butadiene and a homopolymer of butadiene.

4. The composition of claim 1 wherein the homopolymer constituent comprises polyisoprene and ploybutadiene and said copolymer comprises at least about 50 weight percent of said composition.

* * * * *